United States Patent Office 2,834,722
Patented May 13, 1958

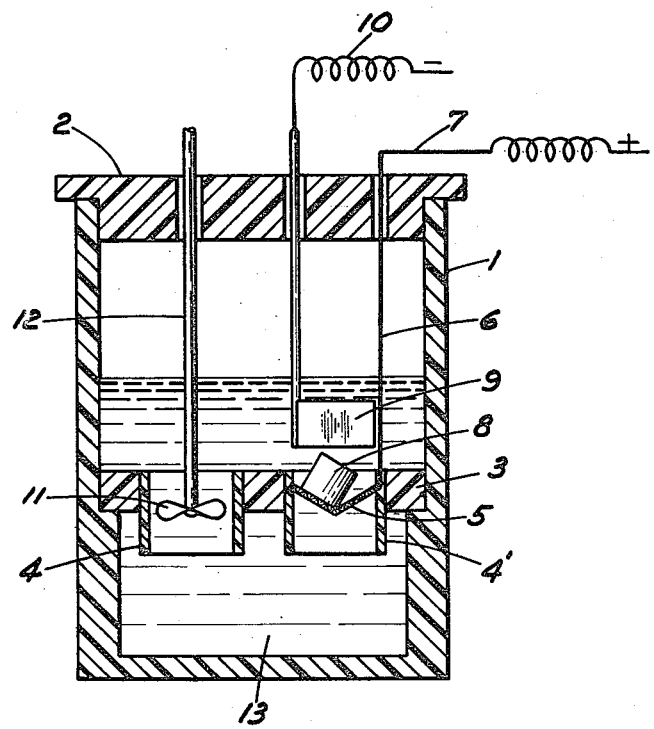

2,834,722

ELECTROCHEMICAL DECONTAMINATION AND RECOVERY OF URANIUM VALUES

James A. McLaren, Byington, and Jerry H. Goode, Kingston, Tenn., assignors to the United States of America as represented by the United States Atomic Energy Commission Application June 8, 1953, Serial No. 359,988

10 Claims. (Cl. 204—1.5)

The present invention relates in general to processes for the decontamination and recovery of uranium values, and more particularly to an electrochemical process for selectively separating uranium values from a mass of metallic uranium contaminated throughout with rare earth values and/or uranium-fission-product values, and/or plutonium values.

As is known, in certain uranium processing operations and applications, there obtain masses of metallic uranium which are contaminated with rare earth values—especially uranium-fission-product values comprising rare earths— most often present in very minor relative proportions, from which the uranium values are desired to be quite sharply separated and rather completely recovered. Such circumstance is encountered, particularly, for example, in the metallurgical recovery of uranium from its ores such as pitchblende which contains appreciable amounts of rare earth values from which it is desired to free the uranium. Another situation, of unusual current importance, requiring such separation and recovery is in the conventional operation of uranium-fueled neutronic reactors, wherein it customarily becomes necessary to reprocess the reactor's fuel elements periodically to decontaminate and purify the same in order to sustain continued operation. Representative of such fuel elements are small, solid cylinders, plates, discs, rods and the like of metallic uranium, usually clad in a protective sheathing of metal such as aluminum. Frequently the metallic uranium is composed entirely of an isotopically-isolated fissionable uranium isotope, such as uranium-235 or uranium-233. Typically, in constituting a neutronic reactor, a multiplicity of such fuel elements are disposed in channels within a neutron-moderating matrix adapted to accommodate the same, in clustered array and in sufficient number to sustain a chain neutronic fission reaction. In the resulting fission reaction, an atom of fissionable uranium isotope, upon absorbing a neutron, splits, thereby forming at least two smaller atoms, and in addition emits a plurality of neutrons which course through the clustered array subject to being absorbed by another atom of fissionable uranium isotope, so as to induce fission thereof and thus propagate the chain reaction. The atoms resulting from the splitting, which with their radioactive decay products are termed "fission products"—comprising isotopes having atomic numbers ranging predominantly from 30 to 63—largely remain intimately dispersed and entrapped within the fuel elements. Among these are various individual fission product species which are markedly interferent with the continued progress of the chain fission reaction. Characteristically, such species are highly neutron-absorptive, and thus deleteriously serve to intercept and drain away neutrons so as to attenuate the further propagation of the chain fission reaction. Consequently, continued operation requires that the concentration of such fission products within the reactor be kept at a very low level. Accordingly, each fuel element, upon attaining enough relative fission product concentration in this respect, ofttimes of the order of a fraction of a percent of the uranium content, is customarily discharged from the reactor, to be processed for elimination of the fission product contamination, and isolation and recovery of the remaining bulk of uranium. This often involves reprocessing a particular quantity of uranium many times over in its successive reuse in the reactor. Furthermore, the fission products are in general highly radioactive and therefore greatly deleterious both from physiological and technical standpoints; consequently, upon completion of service in the reactor, separation of the uranium from most of this hazardous fission product contamination is imperative in order to render it fit for other practical utilization.

Added importance attaches to such reactor fuel element processing where the metallic uranium thereof is isotopically constituted of a substantial proportion of uranium-238, in addition to the fissionable uranium-235 or 233. This occurs, for example, in the use of uranium of isotopic abundance as found in nature. In the course of the fission reaction the resulting neutron irradiation transmutes the uranium-238 to the extremely-valuable 239 isotope of plutonium. In reactor operation with such $U^{238}$-containing fuel elements, which represents the conventional method for the production of plutonium, the uranium fuel elements are ordinarily discharged from the reactor upon reaching an optimum concentration of the order of 0.02% by weight plutonium and a like concentration of uranium fission products. Thereupon, the pronounced toxicity of the plutonium, as well as its extreme value, prompts its expeditious, complete removal from the mass of irradiated uranium metal prior to reuse of the uranium for reactor fuel or other purpose.

The complexity of the task of decontaminating such uranium is indicated by the tabulation of the relative proportionation, among the contained fission products, of the several principal fission product species and their radioactivity, in Table I below.

TABLE I

*Part A.—Estimated weights of fission products produced in mass of neutron-irradiated metallic natural uranium reactor fuel element*

[Per 100 grams of $Np^{239}+Pu^{239}$ simultaneously produced therein. Duration of service within reactor: 100 days. Continuous neutron flux to which exposed: ca. $5\times10^{11}$ neutrons/cm.$^2$ sec.]

| Storage Period After Discharge from Reactor (days) | 0 | 60 | 100 |
|---|---|---|---|
| Element: | | | |
| Se | 0.1 | 0.1 | 0.1 |
| Br | 0.06 | 0.06 | 0.06 |
| Kr | 1.5 | 1.5 | 1.5 |
| Rb | 1.8 | 1.8 | 1.8 |
| Sr | 4.9 | 4.3 | 4.1 |
| Y | 3.9 | 3.0 | 2.5 |
| Zr | 10.7 | 10.6 | 10.8 |
| Cb | 4.2 | 4.9 | 5.3 |
| Mo | 7.9 | 8.7 | 8.8 |
| 43 | 2.8 | 2.9 | 2.9 |
| Ru | 6.0 | 5.6 | 5.5 |
| Rh | 0.7 | 1.0 | 1.1 |
| Pd | 0.5 | 0.6 | 0.6 |
| Ag | 0.06 | 0.09 | 0.10 |
| Sb | 0.03 | 0.02 | 0.02 |
| Te | 1.5 | 1.3 | 1.3 |
| I | 0.7 | 0.7 | 0.7 |
| Xe | 11.9 | 11.9 | 11.9 |
| Cs | 11.4 | 11.6 | 11.6 |
| Ba | 5.1 | 4.4 | 4.4 |
| La | 4.5 | 4.4 | 4.4 |
| Ce | 12.4 | 11.7 | 11.2 |
| Pr | 5.3 | 5.2 | 5.1 |
| Nd | 9.6 | 11.3 | 11.9 |
| Pm | | | |
| Sm | 3.3 | 3.3 | 3.3 |
| Eu | 0.4 | 0.5 | 0.5 |
| Gd | 0.02 | 0.02 | 0.02 |
| Np | 4.2 | 1.0 | 1.0 |
| Pu | 96.7 | 100.0 | 100.0 |

*Part B.*—*Distribution of beta and gamma activity in reactor fuel element among principal fission product species*

[As percentage of total counts per minute.]

| Storage Period after Discharge from Reactor | 100 days |
|---|---|
| Beta Radioactivity Element: | |
| Ce | 27 |
| Sr | 26 |
| Y | 23 |
| Zr | 12 |
| Ru | 3.5 |
| Cb | 3.4 |
| Pr | 0.72 |
| Cs | 0.72 |
| La | 0.72 |
| Te | 0.67 |
| Ba | 0.52 |
| Gamma Radioactivity: | |
| Cb | 40 |
| Zr | 26 |
| Ce | 10 |
| Ru | 8.6 |
| Sr | 4.8 |
| La | 2.3 |
| Y | 2.3 |
| Te | 0.79 |
| Cs | 0.55 |
| Ba | 0.24 |

| Storage Period after Discharge from Reactor | 2 Years |
|---|---|
| Combined $\beta$-$\gamma$ Activity: | |
| Sr | 16 |
| Zr | ~0.1 |
| Ru | 4 |
| Sb | ~0.3 |
| Cs | 15 |
| Ce | 32 |
| Pm | 32 |
| Sm | 0.4 |
| Others | (small) |

As is apparent, the proportionation of fission product species varies somewhat with time after the irradiation of the metallic uranium as the shorter-lived species rapidly decay radioactively to form longer-lived decay products. The relative proportion of any plutonium simultaneously present depends largely upon the initial isotopic abundance of $U^{238}$ in the uranium irradiated; in the case of initial uranium isotopic constitution as found in nature, the resulting concentration of plutonium produced normally is roughly equal the concentration of uranium fission products produced.

In the past, for high-purity separation of the uranium content of such metallic fuel elements from the associated fission products, and also from any plutonium present, operations involving acidic dissolution of the contaminated uranium metal, and the preferential carrier precipitation of contaminants from the resulting solution have been extensively employed. In such operations, concentrated nitric acid is utilized to dissolve the metallic uranium, thereupon after aqueous dilution sulfuric acid is added to solubly-complex the dissolved uranium with sulfate ion, and then bismuth phosphate is precipitated in the solution to carrier precipitate much of the fission product content and most of any plutonium therefrom. After removal of the carrier precipitate, the uranium values in the remaining supernatant solution are further decontaminated and purified by liquid-liquid extraction procedures; basically, upon the contacting the solution with an organic extractant comprising a minor volumetric proportion of tributyl phosphate dissolved in a major volumetric proportion of a liquid paraffin approximating kerosene, the uranium values are preferentially extracted into the organic phase, and further by employing conditions wherein the organic extractant becomes at least 70% saturated in uranium values, fission-product contamination and any plutonium values are substantially excluded. Returning to the bismuth phosphate carrier precipitate, any plutonium therein is segregated and separately recovered by conventional procedure involving a protracted series of stagewise, alternating carrier precipitations both of plutonium away from fission products, and of fission products away from plutonium, employing bismuth phosphate and lanthanum fluoride as the carriers. Recently developed alternative procedures, applicable after the acid dissolution and aqueous dilution of the metallic uranium, involve directly contacting the resulting solution with the aforementioned extractant comprising a minor volumetric proportion of tributyl phosphate dissolved in a major proportion of a liquid paraffin approximating kerosene, and terminating contact before the extractant has attained a 70% saturation in uranium; thereby, tetravalent plutonium and uranium values are preferentially extracted into the organic phase, largely to the exclusion of fission-product-contamination. Thereafter, the plutonium is preferentially stripped from the extractant with an aqueous nitric acid solution containing a reductant appropriate for vigorously reducing the plutonium to its trivalent state, leaving the preponderance of the decontaminated uranium values in the extract to be separately stripped therefrom with water. Further details concerning these prior uranium recovery procedures are to be found in co-pending applications of the common assignee, as for example:

S. N. 519,714, filed January 26, 1944, in the names of Thompson and Seaborg, for Improved Bismuth Phosphate Separation Method, now Patent No. 2,785,951, dated March 19, 1957;

S. N. 303,692, filed August 11, 1952, in the names of Ellison and Runion, for Process for Segregating Uranium from Plutonium and Fission Product Contamination; and S. N. 303,691, filed August 11, 1952, in the names of Runion, Lanham, and Ellison, for Process for Segregation of Plutonium, Uranium, and Fission Product Values.

Although these previous decontamination operations have been demonstrated to be unquestionably successful in full-scale practice, nevertheless they have not proven to be unqualifiedly satisfactory for the purpose. In particular, the nitric acid dissolution of metallic uranium regularly is accompanied by considerable evolution of gases to the extent of some 7,000 cubic feet per ton of uranium dissolved; in the case of reactor fuel elements these comprise, in addition to mostly nitrogen oxides and oxygen, highly-radioactive gaseous fission-product species (iodine, xenon, and krypton), which fact normally precludes direct release to the atmosphere. Thorough oxidative scrubbing of these corrosive off-gases, say with concentrated nitric acid, for removing and thus avoiding hazardous escape of their radioactive components, entails no little difficulty. Along the same line, the highly-acid conditions needed throughout the prior uranium decontamination operations present serious corrosion problems in practice; in general this requires that all of the extensive processing apparatus in contact with the acidic solutions be constructed of special materials, such as stainless steel. In the case of the carrier precipitation operations, the numerous repetitions of precipitations and intermediate centrifugation and dissolution stages have long been recognized to be unduly painstaking and time consuming, and in both the carrier-precipitation and the solvent-extraction operations the utilization of very dilute solutions inefficiently entails enormous volumes needful of huge processing apparatus to handle the same. Of especial practical significance, the removed fission products, being highly radioactive, require storage in radiation-shielded containers to avoid intolerable radiation hazards; the discharge from these uranium decontamination operations of the fission products in the form of very-dilute, difficultly-concentratable solutions consequently makes a continual immoderate demand for ever more capacious shielded storage space for progressively accumulating such dilute fission product solutions. Of imposing concern is the costliness of these operations, particularly as results from their consumption of expensive inorganic precipitants and organic solvents. Too, in addition to their costliness, the added inorganic precipitants, organic solvents, and other materials tend to be difficult, in themselves, to eliminate from the uranium, and thus impose further problems in the decontamination of the uranium. In view of such unfavorable characteristics and shortcomings, there has been an increasing desire that new, effective means, be found for contributing to simpler and more efficient separation of uranium values from such contamination.

Accordingly, one object of the present invention is to provide an improved process for the segregation of uranium values from a mass of metallic uranium containing the same together with contaminating rare earth and/or uranium fission product and/or plutonium values.

Another object is to provide such a process wherein one simple principal operation affords both aqueous dissolution of the metallic uranium mass and segregation of the dissolved uranium from substantial proportions of said contaminants.

A further object is to provide such a process which is of high efficiency in the segregation and concentration of any extremely-valuable plutonium involved.

Still another object is to provide such a process wherein the dissolution of metallic uranium, and other processing, is effected without the use of highly-corrosive acid conditions.

Still a further object is to provide such a process wherein the dissolution of metallic uranium does not entail copious evolution of gases.

Yet another object is to provide such a process which admits of greater uranium concentration in the produced solutions, toward easing subsequent processing-volume requirements.

Yet a further object is to provide such a process wherein contaminants are delivered in a concentrated form adapted to storage in notably small shielded volume.

Again another object is to provide such a process which avoids, in a large measure, need for consumption of expensive chemicals, and which otherwise affords substantial savings in cost and mitigation of adverse further contamination of the uranium with added reagents.

Additional objects will become apparent hereinafter.

In accordance with the present invention, uranium values are segregated and separately recovered from a mass of metallic uranium contaminated throughout with values from the group consisting of rare earth values and plutonium values, by a method which comprises subjecting said mass of uranium to anodic dissolution in an electrolytic cell containing aqueous alkali bicarbonate solution as its electrolyte, thereby promoting a concomitant settling from the solution of a solid sludge from about the electrodes of said cell, and separating the resulting electrolyte solution containing consequently-decontaminated anodically-dissolved uranium values from the resulting sludge containing a substantial amount of said contaminating values. Applicants have found that aqueous alkali bicarbonate is eminently effective as an electrolyte for affording anodic dissolution of metallic uranium with ease and electrochemical efficiency. Even more significantly, applicants have discovered that in such anodic dissolution of metallic uranium in aqueous alkali bicarbonate, a small amount of a varicolored sludge forms on the surface of the metallic uranium as a filmy deposit thereon and also in the proximity of other electrode parts, which tends to fall away from the uranium and settle generally from solution. Propitiously, such sludge was further discovered to contain a substantial proportion of the contaminating rare earth values, and of fission product values, especially rare earth fission product species, present in the original metallic uranium. In addition, where plutonium is present, it was still further discovered that a substantial proportion of such plutonium, in some cases well over 99% thereof, is contained in the obtaining sludge. Furthermore, the sludge demonstrates good settling and filtration qualities; consequently, upon completion of the anodic dissolution, the bicarbonate solution is readily separated from the sludge which has settled to the bottom thereof by simple procedures such as decantation, filtration, or the like, thereby obtaining an aqueous solution of nearly all of the uranium, free of the substantial portions of contamination left behind in the sludge. The remaining sludge contains the removed rare earth, fission product, and/or plutonium values in a well-concentrated form adapted to efficient shielded storage, or to easy dissolution for subsequent processing to isolate any plutonium values therein. In this way, in one simple electrochemical step, the metallic uranium is not only rapidly dissolved, but effectively separated from significant amounts of contaminants as well. Gas evolution during dissolution is normally limited to minor cathodic hydrogen evolution attendent the use of an inert cathode, and even this evolution may be eliminated by alternative resort to conventional non-gassing cathode reactions. The uranium is delivered in a simple form, mildly alkaline in nature, admissive of uranium concentrations of up to 80 grams per liter and above, and eminently suited to continued further chemical processing; furthermore, the bicarbonate may ultimately be readily eliminated by mild acidification of the solution with consequent evolution of the carbon dioxide therefrom, leaving only an alkali metal cation remaining associated with the decontaminated uranium. Of especial practical significance in accomplishing the instant operation, relatively cheap electrical energy is used in place of the expensive reagents required in prior processes. For example, in applying applicants' process to one of the metallic natural-uranium fuel elements discharged from a neutronic reactor in regular plutonium-production plant operations, contaminated with ca. 0.01% plutonium and a like concentration of uranium fission products, it was found that the uranium readily dissolved anodically, requiring less than 3 kilowatt-hours of electrical energy per kilogram of uranium dissolved, and that 99.2% of the plutonium and ca. 74 percent of the gross fission product $\beta$-$\gamma$ radioactivity (ca. 87% of the rare-earth fission-product radioactivity) present were removed with the sludge. Furthermore, in this application, it was found that the cost of the operation (based upon costs of merely reagents and electrical power) was only ca. 10% of the cost of equivalent dissolution of the uranium in nitric acid, and was less than 3% of the cost of such acid dissolution followed by bismuth phosphate carrier precipitation for effecting comparable removal from solution of the preponderance of the plutonium and a portion of the fission product contamination. Being of such efficiency, and having such beneficial attributes, the present process clearly affords substantial practical advantages in uranium decontamination and recovery.

For effecting the present process, an electrolytic bath adapted to accommodate the mass of contaminated metallic uranium to be dissolved, immersed as the anode, is provided. The bath, constituted of an aqueous solution of alkali bicarbonate, should normally be free of all extraneous materials, so as to conserve electrolytic current effiicency and to avoid contributing to further contamination of the uranium. Among the alkali bicarbonates, the familiar sodium and potassium derivatives are the more convenient, while sodium bicarbonate is particularly preferred. In order that the solution may be effectively electrolyzed, it should meet the customary requirement of including a concentration of electrolyte sufficient to provide a reasonable magnitude of electrolytic conductance. While concentrations of aqueous sodium bicarbonate as low as 1 gram per liter or so would be operative in this connection, it is generally desirable that the bicarbonate concentration be as great as practicable in the interest of efficiently minimizing voltage drop through the electrolyte bath; accordingly, bicarbonate solutions saturated or approaching saturation at the ambient temperature are particularly preferred.

Having provided such an electrolyte bath, the contaminated metallic uranium mass is immersed therein as an anode, and an electrolytic current is passed through the bath between it and a cathode in electrolytic current conducting relationship with the bath. For establishing the necessary electrical contact between an external source of electromotive force and the mass of uranium being dissolved, an inert lead-wire may be affixed to the uranium mass, or more conveniently the uranium mass may be disposed upon or within a chemically-inert, electronegative metal grill or wire basket; constituting such a grill or basket of nickel, and electrically-insulating all surfaces other than those adapted to support the uranium mass, is the preferred arrangement. The cathode employed may conveniently be comprised of a chemically-inert, electro-negative metal immersed elsewhere in the electrolyte bath, whereupon the cathode reaction will ordinarily be simple hydrogen evolution. For this purpose, platinum, or more practically nickel or stainless steel, is appropriate. However, where desirable, the cathode may be disposed in a separate electrolyte bath, separated from the described bath by a conventional salt bridge or diaphragm, whereupon the described bath serves merely as the anolyte. The latter arrangements ae beneficial where the contaminants in the metallic uranium are radioactive, in which case they avoid hydrogen evolution directly from the contaminant-containing solution and the entrainment and accompaniment of radioactive materials with the same. Disposition of both electrodes amply above the bottom of the bath, with the cathode best being located directly above and in close proximity to the uranium mass, is in order, so to minimize interference with the important settling of the contaminant-bearing sludge and accumulation of the same at the bottom of the cell. Continuous circulation of the electrolyte solution past the electrodes has been demonstrated to be especially beneficial in promoting removal and settling of the filmy deposit which forms upon the surface of the uranium mass during electrolysis, and in general is considered highly important for effective and efficient operation. By virtue of the benign nature of the aqueous alkali carbonate solution from a corrosion standpoint, construction of the cell of such materials as cast iron, mild steel, or plastic is satisfactory and economical.

In the operation of such a cell, the impressed voltage and the current densities at the electrodes are satisfactorily susceptible to considerable variation. Generally speaking, though, in the interest of avoiding a competitive anode reaction, the voltage impressed across the cell should not be raised to such a high level that anodic oxygen evolution is incurred. However, in a saturated alkali bicarbonate solution, oxygen evolution will not normally commence until the anode potential is made at least 0.75 volt positive (with respect to the standard hydrogen electrode at 25° C.) and for unsaturated bicarbonate solutions even more positive anode potentials are necessary; in comparison, anodic dissolution of uranium normally commences at an anode potential as low as −1.4 volts and even less, with the dissolution becoming more vigorous as the anode potentinal is raised to more positive values. Thus, a broad latitude of operational anode potentials is available for effecting the uranium dissolution without competition from oxygen evolution. Even if so strenuous an anode potential as to produce anodic oxygen evolution is being used, the gassing will be visually apparent, whereupon the impressed voltage across the cell may be reduced to less drastic values until the oxygen evolution ceases; in any case, anodic oxygen evolution is generally not a serious consequence, for although it represents waste of electric power, it generally does not disrupt the anodic metal dissolution. In practice, it is desirable that the voltage impressed across the cell be adequate to sustain a reasonably vigorously current flow through the cell, but without being so great as to incur excessive overheating of the electrolyte solution with attendant decomposition of the bicarbonate and the like. In this respect, currents representing anode current densities as high as 50 amperes per square decimeter are usually satisfactory. However, it has been found that low anode current densities tend to favor formation of the essential sludge and good setting properties of the same. Accordingly, it is preferred simply to increase the impressed voltage until electrolytic current flow, representing anodic uranium dissolution, within the range approximating 1 to 5 amperes per square decimeter of metallic uranium surface area obtains, with anodic current densities approximating 2.5 amperes per square decimeter appearing to be the practical optimum. Cathode current densities approximating the same range and preferably even lower are desirable in the interest of economically minimizing cathodic hydrogen-evolution overvoltages; accordingly, a cathode with surface area at least as extensive as that of the mass of metallic uranium being dissolved is beneficial. Operating under the outlined conditions, the electrolysis proceeds readily at room temperature, with the uranium normally giving no evidence of becoming passive in the bicarbonate solution employed. As the dissolution continues, the concentration of dissolved uranium in solution progressively increases, with the deposit and sludge continuously forming upon the surface of the dissolving uranium and about the cathode, and promptly settling from solution in an amount of the order of ca. 1 to 10% by weight of the uranium dissolved. While it is desirable to attain as high a concentration of uranium in the solution as practicable, it is found that as the uranium concentration increases, the filmy deposit on the surface of the dissolving uranium mass tends to become increasingly more and more adherent. In turn, the increasing amounts of deposit persistently remaining on the surface of the uranium impose an ever increasing resistance to electrolytic current flow, which in time leads to a need for progressively increasing the voltage across the cell to sustain reasonable current densities; this ultimately becomes a serious interference with the further continuance of the dissolution operation. Circulating the electrolyte over the mass of uranium being dissolved serves to keep the surface fairly clear of deposit, until the solution concentration reaches a level approximating 40 to 50 grams per liter of dissolved uranium, whereupon the dissolution tends to become decidedly sluggish. Nevertheless, it has been found that such sluggishness at this point may be counteracted so as to afford substantial further increase in the uranium concentration in the solution, by such additional measures as:

(a) Periodic momentary reversal of polarity through the cell,
(b) Intermittent breaking of the current through the cell; or
(c) Superimposing alternating current upon the cell's direct current, or resort entirely to alternating current.

These special measures tend to keep the deposit broken down into a condition where it is readily removed by the circulating electrolyte. Among such special measures, particularly advantageous results have been achieved by employing a single-phase half-wave rectified current as the operative electrolytic current through the cell; in this way uranium concentrations as high as 82 grams per liter have been attained. While anodic dissolution can be continued after reaching such a high concentration, uranium thereafter dissolved tends to forthwith precipitate as uranium carbonate, serving to impose a practical maximum on the uranium solution concentration generally obtainable. In practical application, though, it appears to be more rapid and generally expedient simply to accept, as the end product of the operation, the uranium solution at the 40 to 50 grams per liter concentration level afforded by simple circulation, without incurring the added complexity of the special measures available. In any case, upon attaining the maximum desired concentration of uranium, the electrolysis is then interrupted, the supernatant uranium-bearing electrolyte solution is carefully withdrawn from the cell, say by siphoning, leaving the sludge behind, and is thereupon replaced with a fresh bicarbonate solution whereupon electrolysis is recommenced and the anodic uranium dissolution resumed. In the presence of the fresh uranium-free solution, as the anodic dissolution continues, the surface of the dissolving uranium quickly becomes clean again, whereupon the current and voltage are returned to their original values. When the mass of uranium becomes completely dissolved, it may immediately be replaced with another mass of metallic uranium, and the dissolution operation continued. The settled sludge, containing the segregated rare-earth, fission-product and/or plutonium values, may conveniently be permitted to accumulate in the bottom of the cell until a sizeable volume obtains, prior to its removal.

Of especial significance in connection with the removal of the sludge from the cell, it is considered especially beneficial that a substantial amount of the sludge be left remaining in the cell at all times during dissolution. Empirical results indicate that the presence of a substantial quantity of the sludge from the outset of electrolysis promotes the removal of contaminants by the sludge, to the end that the proportion of rare earths, fission products, and/or plutonium removed by the sludge is markedly enhanced. While the nature of this apparent catalytic or promoting action is not well understood, it is deemed particularly profitable, in anodically dissolving a succession of uranium masses, to maintain in contact with the electrolyte throughout dissolution a substantial amount of sludge formed during previous anodic dissolutions, in order to take advantage of the beneficial action afforded.

The precise composition of the varicolored sludge is not fully known, but presumably it is a somewhat complex mixture of largely hydroxide and/or hydrated oxides of uranium, possibly in various stages of polymerization, together with the contaminating rare earth, plutonium, and/or fission product values. Significantly, it has been found that among the various portions of sludge of different color—ranging from yellow through yellow-brown to black—the black portions exhibit a markedly superior affinity for plutonium and for removing the same from solution therein. That is, analyses have shown that the black portions of the sludge contain plutonium in concentration many times that in the yellow and yellow-brown portions. Accordingly, during electrolysis, conditions which may be visibly noted to favor formation of sludge of black color are to be favored over those noted to produce lighter-color deposits and sludge; experimentation gives some indication, for example, that the formation of the black sludge is promoted by low anodic current densities.

Upon removal from the cell of the resulting aqueous solution, the dissolved uranium therein is sufficiently decontaminated that it may frequently be acceptable as a final product. In the event that further decontamination is desired, the aqueous solution form of the uranium eminently adapts it to further chemical processing for the purpose. Various processes are applicable. Precipitation of specific carriers in the solution to selectively remove any remaining traces of contamination is ordinarily effective; for example, the precipitation of calcium oxide in the bicarbonate solution, preferably by electroprecipitation at the cathode of an electrolytic cell, is effective in removing sizeable proportions of any remaining plutonium values, and of rare-earths, especially cerium and praseodymium from the solution. Percolating the solution through a bed of fuller's earth is effective in removing any cesium, zirconium, and niobium values from the solution, as well as portions of any ruthenium and plutonium values, by adsorption in the bed, while the bicarbonate solution of uranium drains from the bed. Cathodic electrodeposition is applicable to remove certain remaining traces of contamination; this is highly effective, upon adding strong oxidants such as $KMnO_4$ to the alkali bicarbonate solution, in removing any remaining ruthenium values. Prior art carrier precipitation and solvent extraction procedures alluded to earlier are also applicable, although usually not required. Following any such further decontamination procedures as may be appropriate, it is advantageous to ultimately recover the decontaminated uranium by precipitation as hydroxide, such that the remaining supernatant alkali bicarbonate solution may be economically recycled to serve again as electrolyte solution in dissolving future masses of contaminated metallic uranium in accordance with the instant invention. For this purpose electroprecipitation of the uranium as hydroxide from the solution has proven highly advantageous in that it avoids adding any reagents to a solution, which would thereafter undesirably remain in the alkali bicarbonate solution; the uranium solution is simply electrolyzed in the cathode compartment of a two-compartment electrolytic cell divided by a porous diaphragm, containing a similar, but uranium-free, alkali bicarbonate solution in its anode compartment, whereupon the resulting preferential migration of sodium ions to the cathode compartment substantially increases the pH therein producing the precipitation of the uranium as hydroxide.

Likewise, the sludge removed from applicants' cell may be subjected to further chemical processing to recover valuable components therein. The sludge has proven to dissolve readily in aqueous alkali bicarbonate solutions containing hydrogen peroxide, and further processing procedures similar to those alluded to hereinabove are available for recovering rare earths, plutonium, and any other valuable materials from the resulting solution. In connection with the incorporation of hydrogen peroxide in aqueous sodium bicarbonate for use in sludge dissolution, it has been noted that the addition of so little as one-half milliliter of 30% hydrogen peroxide to one liter of saturated sodium bicarbonate is sufficient to initiate active sludge dissolution. In the same way, similar small proportions of hydrogen peroxide added to the aqueous alkali bicarbonate electrolyte during the anodic dissolution of uranium were found to promote rapid removal of excessive amounts of filmy deposit from the surface of the dissolving uranium, although at the expense of dissolution of considerable amounts of the sludge being formed; however, where the amount of peroxide employed is small enough that a substantial volume of sludge still obtains, decontamination efficiency has been found to be attenuated very little, and in some cases to be actually improved. Accordingly, in practice, such use of hydrogen peroxide may be profitable in special cases for accelerating anodic dissolution, without adversely compromising decontamination efficiency.

While conducting the present process is not limited to any specific design of electrolytic apparatus, the electrolytic cell devised by applicants and illustarted in the appended drawing has proven to be particularly efficacious for the purpose. Referring to the drawing, a vertical cylindrical tank 1, provided with a cover 2, has removably disposed therewithin a horizontal plate 3, dividing the interior of the tank into an upper and a lower compartment. In respective large vertical perforations in said plate 3, are affixed a pair of symmetrically-spaced, stubby, vertical, open-ended cylindrical circulation wells 4, 4', affording ample communication between said upper and lower compartments. In one of the circulation wells 4', an inverted-conical, shallow, nickel-wire basket 5, electrically-insulated upon all but its inner surfaces, is suspended from the cover 2, by a rigid, insulated electrical conductor 6, which is in turn in electrically-conductive relationship with an anode lead-wire 7, leading from outside the covered tank 1. The nickel-wire basket 5, is adapted to support, in electrically-conductive relationship therewith, a mass of contaminated metallic uranium 8, to serve as the anode in this electrolytic cell. Also rigidly suspended from the cover 2, and disposed immediately above, and in closely-spaced relationship with, the mass of uranium metal 8, is a nickel crow-foot cathode 9, in electrically-conductive relationship with a cathode lead wire 10, also leading from outside the covered tank 1. Within the other circulation well 4, a horizontal stirring impeller 11, is affixed to the end of a vertical, rotatable drive rod 12, suspended from above and passing through an aperture provided therefor in the cover 2. An aqueous alkali bicarbonate electrolyte solution 13, is contained in the tank 1, and maintained at such a level as to completely immerse the uranium metal anode 8, the cathode 9, and the stirring impeller 11.

In operation, the stirring impeller 11, is driven to induce a circulation of the electrolyte solution 13 upward through circulation well 4, and downward through circulation well 4'. Thereupon, a source of electromotive force is impressed between the anode lead-wire 7, and the cathode lead-wire 10, in the usual fashion, and is increased to such magnitude as to produce electrolytic current through the electrolyte solution 13, between the uranium metal 8, and the cathode 9, corresponding to an anode current density at the surface of the uranium metal 8, within the preferred range approximating 1 to 5 amperes per square decimeter. Throughout the electrolysis, the anode current density is maintained within the same range by appropriate regulation of the magnitude of electromotive force impressed between the anode and cathode lead-wires. Gradually the mass of uranium metal 8, anodically dissolves, and the important filmy deposit and sludge continuously forms at the surface of the uranium metal 8, and the vicinity of the cathode 9, and thereupon falls away and settles through circulation well 4', being aided by the circulation of the solution induced by the impeller 11, and accumulating at the bottom of the tank 1. Gaseous hydrogen, continuously forming upon the surface of the cathode 9, bubbles to the surface of the electrolyte solution 13, whence it escapes from the tank through the unsealed apertures in the cover 2 for accommodating the rotatable drive rod 12, and the like, to be vented to the atmosphere or externally collected, first being scrubbed to remove accompanying radioactivity, if appropriate. As the electrolyte solution 13, attains the desired concentration of dissolved uranium, the impressed electromotive force is interrupted, and the cover 2, and with it the cathode 9, nickel-wire basket 5, and the remaining undissolved uranium metal 8, is elevated away from the tank so as to expose the contents of the same, whereupon the contained solution is carefully siphoned off, leaving the therefrom sludge remaining in the tank bottom, and replaced with fresh bicarbonate electrolyte solution. Thereupon, the cover 2, along with the parts attached thereto, is returned to its illustrated position, whereupon electrolysis is resumed. As each piece of uranium metal 8, becomes substantially completely dissolved, a fresh mass of contaminated metallic uranium is added to continue the operation. Periodically, upon conclusion of a siphoning of the electrolyte solution, the horizontal dividing plate 3, with circulation wells 4, 4' attached, is removed from the tank 1, and a portion of the formed sludge is removed, leaving a substantial quantity remaining at the bottom of the tank 1, to catalyze or otherwise promote the efficiency of contamination removal by subsequently-formed sludge.

Further illustration of the quantitative aspects and preferred conditions procedures of the present method is provided in the following specific examples. The first four examples illustrate anodic dissolution of uncontaminated natural uranium metal to afford orientation as to the effect of various parameters upon the dissolution operation, while Example 5 illustrates the simultaneous anodic dissolution and decontamination effected by the present process upon a mass of metallic uranium contaminated with plutonium values and uranium fission product values including rare earth species thereof.

EXAMPLE 1

Five substantially identical one-half inch diameter rods of clean natural uranium metal, each connected to a separate insulated electric anode lead-wire, were each suspended and immersed in a respective beaker containing a ca. 200 milliliter portion of the indicated aqueous electrolyte solution. Into each beaker was also suspended a sheet of platinum, immersed in the electrolyte solution, and also connected to a separate insulated electrical cathode lead-wire to serve as a cathode. Thereupon electrolysis was commenced, with the uranium metal in each case serving as the anode, at an anode current density and for a period as indicated. Thereafter, in each case, the electrolysis was terminated, the uranium concentration of the electrolyte solution was determined, and the anode and cathode were visually inspected. The results are tabulated in Table II below.

TABLE II

*Anodic dissolution of uranium metal in alkali metal bicarbonate electrolytes*

| Electrolyte | Concentration | pH | Anode Current Density (amps./cm.$^2$) | Ampere-Hrs. of Electrolysis | Final Uranium Concentration (g./l.) | Anode Condition | Cathode Condition |
|---|---|---|---|---|---|---|---|
| KHCO$_3$ | Saturated | 8.0 | 0.12 | 0.7 | 5.4 | Slightly Black | Slightly Black. |
| KHCO$_3$ | ___do___ | 8.2 | 0.12 | 0.7 | 5.4 | ___do___ | Do. |
| KHCO$_3$ | ___do___ | 8.5 | 0.12 | 10.0 | 38.6 | Flaky Black Deposit. | Do. |
| NaHCO$_3$ | ___do___ | 8.0 | 0.44 | 3.5 | 32.0 | Clean | Do. |
| NaHCO$_3$+H$_2$O$_2$ | Saturated ca. 0.5 ml. of 30% per liter solution. | | 0.12 | 3.0 | 33.1 | ___do___ | Clean. |

EXAMPLE 2

Employing apparatus similar to that used in Example 1, a substantially identical uranium rod anode and a sheet platinum cathode were suspended in a beaker, and immersed in ca. 200 milliliters of saturated sodium bicarbonate solution therein. Electrolysis was effected at a constant impressed voltage across the cell, which produced an initial anode current density of ca. 20 amperes per square decimeter. As the electrolysis proceeded, the electrolyte solution was periodically sampled and analyzed for uranium concentration, and the electrode conditions and changes in electrolytic current were noted. Results are presented in Table III below. Thereupon, the polarity of the impressed electromotive force was momentarily reversed, and then restored; the current through the cell immediately increased to ca. 20 amperes per square decimeter of uranium anode, approximating its initial value at the outset of the run.

TABLE III

*Anodic dissolution of uranium metal—effect of deposits forming on electrodes*

| Uranium Concentration (g./l.) | Electrode Conditions |
| --- | --- |
| 29.4 | No coating. |
| 48.4 | Coating reduced current. |
| 56.5 | Coating covered electrodes; low current. |

EXAMPLE 3

Employing the general apparatus arrangement as in Examples 1 and 2, three parallel runs were made employing a sheet nickel cathode, saturated sodium bicarbonate as the electrolyte, and a single-phase, half-wave rectified-alternating-current potential was impressed across the cell to effect the electrolysis. Details of conditions and results are presented in Table IV below.

TABLE IV

*Anodic dissolution of uranium metal—with half-wave rectified potential*

| Run No. | 1 | 2 | 3 |
| --- | --- | --- | --- |
| Temperature (° C.) | 80 | 25 | 25. |
| Amperes | 3.5 | 1.0 | 1.0. |
| Volts (across cell) | 1.0 | 3.0 | 3.0. |
| Duration of Electrolysis (hrs.) | 1.0 | 3.0 | 2.75. |
| Final Uranium Concentration (g./l.) | 32.1 | 33.1 | 28.7. |
| Anode Condition at Termination | Clean | Clean | Clean. |
| Cathode Condition at Termination | Slight deposit. | do | Do. |

EXAMPLE 4

Again employing apparatus as in foregoing Examples 1 and 2, electrolysis employing a platinum cathode, and saturated aqueous sodium bicarbonate as the electrolyte a 10-volt 60-cycle alternating current was applied to the cell to effect the electrolysis. Results are presented in Table V below.

TABLE V

*Anodic dissolution of uranium metal—with alternating current*

| Time (hrs.) | Final Uranium Concentration (g./l.) | Remarks |
| --- | --- | --- |
| 5 | 14.6 | Electrodes clean; turbidity in solution. |
| 10 | 28.2 | Electrodes clean; sludge precipitating in electrolyte. |
| 20 | 36.0 | Electrodes clean; large amount of sludge precipitated. |

EXAMPLE 5

An aluminum-encapsulated metallic natural uranium fuel element of a neutronic reactor, which, after irradiation for 1170 days in a thermal neutron flux of ca. $5 \times 10^{11}$ neutrons per square centimeter per second in its reactor, was thereupon discharged from the reactor and stored for 2 years to permit radioactive decay. The resulting mass of irradiated uranium, found to contain 0.0117% by weight plutonium and approximately the same weight of combined fission products of proportionate composition substantially the same as that indicated in Table I hereinabove, was removed from its aluminum capsule, and a ca. 250 gram unitary section thereof was obtained. This section was measured to have a surface area of 42 square centimeters. The section was disposed as the anode in an electrolytical cell substantially the same as shown in the drawing. The nickel crow-foot cathode employed was "3-toed," and had an area of 222 square centimeters. The electrolyte employed was substantially saturated aqueous sodium bicarbonate (83 grams $NaHCO_3$ per liter), and the initial electrolyte solution volume used was 1235 milliliters. Electrolysis was commenced, operating at room temperature, with 3.5 volts D. C. impressed across the cell, providing a total current of one ampere, and giving an initial anode current density of 2.4 amperes per square decimeter and an initial cathode current density of 0.45 ampere per square decimeter. Operation of the cell was continued, with uranium dissolution and sludge settling proceeding uneventfully, until the electrolysis was terminated with 24.7 ampere hours per liter of current having passed. During the run, samples (ca. 925 milliliters) of the solution were removed for analysis after 4.08 and 9.68 ampere hours per liter of electrolysis respectively, and the sample volume removed from the cell was in each case immediately replaced with fresh bicarbonate solution to maintain the total volume of 1235 milliliters. After said termination, the supernatant bicarbonate solution was carefully removed from the cell, leaving the settled sludge behind, whereupon 1250 milliliters of fresh bicarbonate solution were introduced into the cell, and the electrolysis was recommenced and continued under the same conditions until 35.4 ampere hours per liter of additional current had passed. Throughout both runs there was no apparent actual interference by the filmy deposit with the rate of dissolution of the uranium anode, and the current passing did not deviate substantially from its one ampere value at the set 3.5 volts impressed potential throughout the two stage run. After termination of the electrolysis, the second quantity of solution obtaining in the cell was carefully withdrawn, and the sludge was separately removed. The two separately withdrawn solutions, and the solution samples taken during the first electrolysis, were each chemically analyzed for uranium concentration and radiometrically analyzed for plutonium content, and for total beta-gamma radioactivity; the solution obtained in the second electrolysis was further radiometrically analyzed to determine beta activity distribution among the principal fission product species. From the sludge, separate samples of black portions, of yellow- and-yellow-brown portions, and of the two mixed were obtained and radiometrically analyzed for plutonium content. Conditions and results are tabulated in Tables VI, VII and VIII below.

TABLE VI

*Anodic dissolution of uranium metal—contaminated with plutonium and fission products*

| Run No. | Volume (ml.) | Total Electrolysis (amp.-hrs./l.) | Total Uranium Dissolved (gms.) | Plutonium in Solution* | | Fission Product β-γ Activity in Solution | | Percentage of Original Contaminants in Sludge | |
|---|---|---|---|---|---|---|---|---|---|
| | | | | α cts./min./mg. U | α cts./min./ml. | α cts./min./ml. (14% Geometry) | α cts./min./mg. U (14% Geometry) | Plutonium | Fission Product β-γ Activity, percent |
| 1 | 1,235 | 4.08 | 5.93 | 8,380 | 40,238 | | | | |
| | 1,235 | 9.68 | 16.72 | 3,920 | 34,260 | | | | |
| | 1,235 | 24.68 | 44.07 | 3,580 | 78,370 | $2.5 \times 10^7$ | $8 \times 10^5$ | 22 | |
| 2 | 1,250 | 35.4 | 52.50 | 23 | 958 | $9.1 \times 10^6$ | $2 \times 10^5$ | 99.2 | **ca. 74 |

*24,000 α counts/min.≅1 microgram plutonium; original uranium mass contained ca. 2808 α counts/min./mg. uranium.
**Ca. 87% of total rare earth activity.

TABLE VII

*Beta radioactivity distribution of uranium solution derived in run #2, Example 5*

| Major Fission-Product Species | Percentage of Total Activity in Solution |
|---|---|
| Cs | 44 |
| Ru | 26 |
| Sr | 16 |
| Ce | 3 |
| Zr | 1 |

TABLE VIII

*Plutonium concentration in sludge obtained in Example 5*

| Sample Number | Color | Plutonium Concentration (cts./min./mg. of sludge) |
|---|---|---|
| 1 | Black | 78,250 |
| 2 | do | 131,000 |
| 3 | Yellow—Yellow-Brown | 4,300 |
| 4 | do | 3,870 |
| 5 | Mixed | 26,830 |

Although this invention is described with particular emphasis upon its important application to decontamination and recovery of uranium from reactor fuel elements, it is inherently of much wider applicability. The present method is also well adapted to the decontamination and recovery of natural uranium metal from its ores such as pitchblende which contain appreciable amounts of rare earth values from which the uranium is desired to be separated. Furthermore, while applicants' process has been demonstrated with specific reference to the devised electrolytic cell, and its operation, illustrated in the appended drawing, it is susceptible to broad engineering variation. For instance, such a cell may be operated continuously by constantly draining a small stream of uranium-containing electrolyte solution from the cell, while introducing continually a similar stream of fresh bicarbonate electrolyte solution, so as to maintain the electrolyte solution in the cell at a constant predetermined uranium concentration, say 25-30 grams per liter at all times; the sludge may be continuously dredged from the bottom of the cell and separately removed by conventional techniques, and fresh masses of contaminated uranium metal may be added periodically, as needed, to sustain continued operation. Too, in large scale operation, resort may be had to cells comprising multiple cathodes and multiple dissolving uranium metal anodes. Various additional applications and modifications of the hereinbefore-disclosed process will become apparent to those skilled in the art. It is therefore to be understood that all matters contained in the above description and examples are illustrative only and do not limit the scope of the present invention.

What is claimed is:

1. A new and improved process for segregating and separately recovering uranium values from a mass of metallic uranium contaminated throughout with values from the group consisting of rare earth values and plutonium values, which comprises subjecting said mass of uranium to anodic dissolution, employing an anode current density approximating the range of 1 to 5 amperes per square decimeter of surface of the dissolving uranium mass, in an electrolytic cell containing substantially-saturated aqueous sodium bicarbonate solution as its electrolyte while continuously circulating said electrolyte solution past the surface of the anodically-dissolving uranium mass, thereby promoting a concomitant settling from the solution of a solid sludge from about the electrodes of said cell, and separating the resulting electrolyte solution containing consequently-decontaminated anodically-dissolved uranium values from the resulting sludge containing a substantial amount of said contaminating values.

2. The process of claim 1 wherein said anode current density approximates 2.5 amperes per square decimenter of surface of the dissolving uranium mass.

3. A new and improved process for segregating and separately recovering uranium values from a mass of metallic uranium contaminated throughout with values from the group consisting of rare earth values and plutonium values, which comprises subjecting said mass of uranium to anodic dissolution in an electrolytic cell containing aqueous substantially-saturated sodium bicarbonate solution as its electrolyte while circulating said electrolyte solution past the surface of the anodically-dissolving uranium mass, thereby promoting a concomitant settling from the solution of a solid sludge from about the electrodes of said cell, periodically momentarily reducing the potential impressed across the electrodes of said electrolytic cell to thereby mitigate formation of filmy deposit upon the surface of the dissolving uranium mass, and separating the resulting electrolyte solution containing consequently-decontaminated anodically-dissolved uranium values from the resulting sludge containing a substantial amount of said contaminating values.

4. A new and improved process for segregating and separately recovering uranium values from a mass of metallic uranium contaminated throughout with values from the group consisting of rare earth values and plutonium values, which comprises subjecting said mass of uranium to anodic dissolution in an electrolytic cell containing aqueous substantially-saturated sodium bicarbonate solution as its electrolyte while circulating said electrolyte solution past the surface of the anodically-dissolving uranium mass, thereby promoting a concomitant settling from the solution of a solid sludge from about the electrodes of said cell, employing an alternating-current superimposed upon direct current potential impressed across the electrodes of said electrolytic cell for effecting said anodic dissolution to thereby mitigate formation of filmy deposit upon the surface of the dissolving uranium mass, and separating the resulting electrolyte solution containing consequently-decontaminated anodically-dissolved uranium values from the resulting sludge containing a substantial amount of said contaminating values.

5. A new and improved process for segregating and separately recovering uranium values from a plurality of masses of metallic uranium contaminated throughout with values from the group consisting of rare earth values and plutonium values, which comprises subjecting each of said mass of uranium to anodic dissolution in an electrolytic cell containing substantially-saturated aqueous sodium bicarbonate solution as its electrolyte while circulating said electrolyte solution past the surface of the anodically-dissolving uranium mass, thereby promoting a concomitant settling from the solution of a solid sludge from about the electrodes of said cell, separating the resulting electrolyte solution containing consequently-decontaminated anodically-dissolved uranium values from the resulting sludge containing a substantial amount of said contaminating values, and thereafter electroprecipitating uranium values from said separated electrolyte solution as hydroxide, separating the remaining supernatant sodium bicarbonate solution from the so precipitated hydroxide, and reemploying such separated supernatant sodium bicarbonate solution for constituting the electrolyte solution in subsequent anodic dissolution of others of said plurality of masses of contaminated metallic uranium.

6. The method of claim 3 wherein the potential impressed across the electrodes of said electrolytic cell is periodically momentarily reduced by interrupting the current through said electrolytic cell.

7. The method of claim 3 wherein the potential impressed across the electrodes of said electrolytic cell is periodically momentarily reduced by reversing the polarity of said electrodes.

8. The method of claim 3, wherein the potential impressed across the electrodes of said electrolytic cell is periodically momentarily reduced by employing a rectified half-wave source of electromotive force for effecting said anodic dissolution of uranium.

9. The method of claim 1 wherein the adherence of the filmy deposit upon the surface of the dissolving uranium mass is reduced by the addition of a small amount of peroxide ions to the alkali bicarbonate electrolyte.

10. The method of claim 8, wherein approximately one-half milliliter of approximately thirty percent hydrogen peroxide per liter is added to the alkali bicarbonate solution.

References Cited in the file of this patent

UNITED STATES PATENTS

| | | |
|---|---|---|
| 1,462,421 | Pearson et al. | July 17, 1923 |
| 2,630,369 | Burwell | Mar. 3, 1953 |
| 2,654,653 | Nye et al. | Oct. 6, 1953 |
| 2,727,806 | Forward et al. | Dec. 20, 1955 |
| 2,743,222 | Clevenger | Apr. 24, 1956 |
| 2,761,757 | Kamen et al. | Sept. 4, 1956 |
| 2,768,871 | Brown et al. | Oct. 30, 1956 |

OTHER REFERENCES

The Transuranium Elements, Research Papers, edited by Glenn T. Seaborg et al. Part 1 (Papers 1.1 to 6.39), 1st ed., McGraw-Hill Book Co., N. Y., 1949, pp. 29, 34, 35.

The Chemistry of Uranium, by J. J. Katz and E. Rabinowitch, McGraw-Hill Book Co., N. Y., 1951, pages 118, 166, 167, 188.

ACCO-25, U. S. Atomic Energy Comm., August 29, 1952, pages 1, 2, 8. Available from AEC Technical Information Service, Oak Ridge, Tenn. (An article by Clevenger.)

UNITED STATES PATENT OFFICE
CERTIFICATE OF CORRECTION

Patent No. 2,834,722                                                     May 13, 1958

James A. McLaren et al.

It is hereby certified that error appears in the printed specification of the above numbered patent requiring correction and that the said Letters Patent should read as corrected below.

Columns 15 and 16, Table VI, the sub-heading to the seventh column thereof should appear as shown below instead of as in the patent — cts./min./ml. (14% Geometry)

same table, the sub-heading to the eighth column thereof should appear as shown below instead of as in the patent — cts./min./mg. U (14% Geometry)

Signed and sealed this 15th day of July 1958.

(SEAL)
Attest:
KARL H. AXLINE

Attesting Officer

ROBERT C. WATSON
                                                Commissioner of Patents